(No Model.)

J. E. LAYNG.
BELT GUIDE.

No. 308,417. Patented Nov. 25, 1884.

WITNESSES
Wm Mayer.
Jno L Taggard

INVENTOR.
John E. Layng
by Welbron
atty.

UNITED STATES PATENT OFFICE.

JOHN E. LAYNG, OF SAN FRANCISCO, CALIFORNIA.

BELT-GUIDE.

SPECIFICATION forming part of Letters Patent No. 308,417, dated November 25, 1884.

Application filed April 12, 1884. (No model.)

*To all whom it may concern:*

Be it known that I, JOHN E. LAYNG, a citizen of the United States, residing in the city and county of San Francisco, State of California, have invented certain new and useful Improvements in Belt-Guides; and I do hereby declare that the following is a full, clear, and exact description of the same, reference being had to the accompanying drawings, which form a part of this specification.

My invention consists in certain novel constructions and combinations of parts, producing a universal belt-guide, or one that is adapted to turn and guide belts from one pulley to another in all possible positions.

I proceed to form and produce my said improvement in substantially the following manner.

Figure 1:
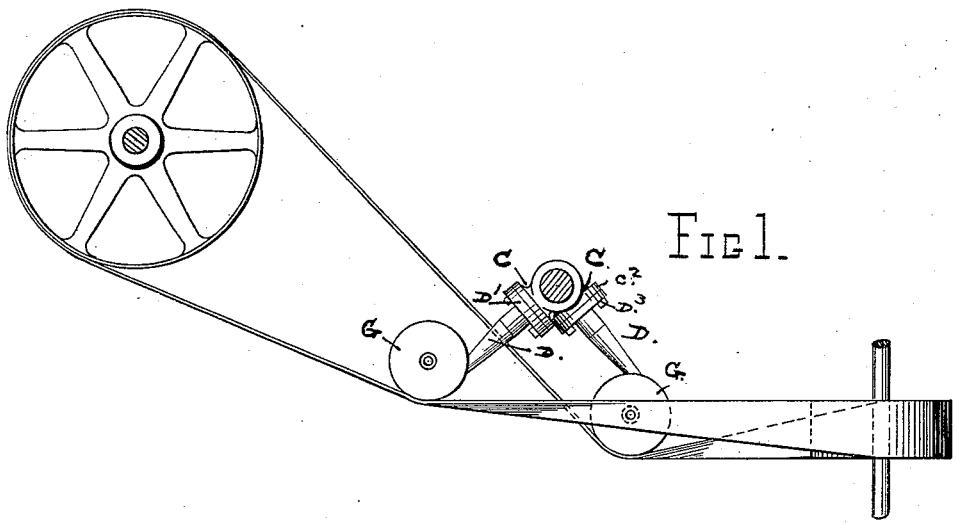
Figure 2:
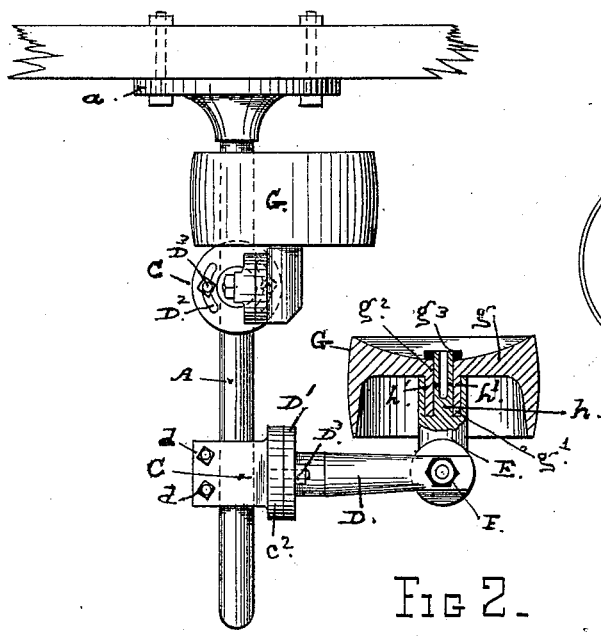
Figure 3:
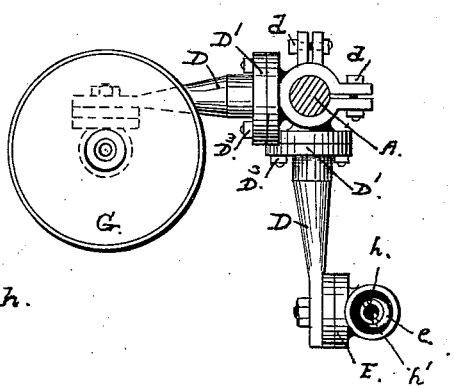

Referring to the drawings, Figure 1 shows the device in position to carry a belt from a large pulley to a small one in a different plane and with a quarter turn or twist. Fig. 2 is an elevation showing the devices fixed to a ceiling, one of the carrying-rollers being in section. Fig. 3 is a cross-section showing the parts in plan.

A rod, A, with a flange, $a$, on one end, forms a post or standard to be secured to a fixed surface, as a beam, a floor, wall, or ceiling. On this post are two movable clamps, C C, that embrace it, and are held in position by means of bolts $d\ d$. The parts, being adjustable along the post, have arms D D attached to them by swivel-joints. The end of the arm D is provided with a circular flange, D', having curved slots $D^2$ in it, concentric with the axis of the arm and of equal length. Through-bolts $D^3$, taking into the plate $c^2$ through the slots, hold the arm to the clamp and permit angular movement and adjustment of the arm. The outer end of the arm has a socket, E, which stands perpendicular to the arm, and is connected to it by a swivel-joint, F. This end E takes the pulley or guide-roller G, and the double joints thus afford universal adjustment of the pulley into any position and angle about the post. The pulleys are set in self-oiling bearings, the construction of which is shown in Fig. 2 of the drawings. The socket E is hollow, and a tubular spindle, $h$, with feed-holes $h'$, is fixed in the center of its space or chamber $e$. The pulley G is cup-shaped, with the closed end $g$ dished or of concave shape, with the greatest depression at the center about the hole $g^2$, through which the spindle projects. A short hub, $g'$, on the inside of the pulley-cavity and around the center hole, fits into the space $e$, between the socket and the spindle, to give sufficient bearing-surface, and a collar, $g^3$, upon the end of the spindle holds the pulley to its place when the socket is set horizontally or at an angle. The object of the concave surface is to afford ready means of supplying oil to the chamber in the socket, as when the pulley is set to run in or nearly in a horizontal plane this concavity forms a funnel to guide the oil into the tubular spindle. It is of no service, however, where it becomes necessary to set the pulleys to run in or nearly in a vertical plane. The general position of the sockets will be a vertical one in nearly all applications and adjustments of this guide, and therefore the funnel-shaped surface of the pulley-head will be usually serviceable.

Band-pulleys have heretofore been constructed with a disk carrying a bracket secured with liberty to rotate on the side of a movable shaft-clamping collar, and a sleeve carried by the bracket on said disk serving as a support for the shaft of a pulley.

Having thus fully described my invention, what I claim, and desire to secure by Letters Patent, is—

1. The herein-described belt-guide, consisting of the post A, adapted to be secured to a stationary surface, the arms D D, held therein by clamps, and having jointed attachment to the clamps, and the guide-pulleys G, having bearings in sockets that are attached to the outer ends of the said arms by swivel-joints F, substantially as set forth.

2. In combination with the adjustable arms D D, having movement about a supporting post or standard, the swiveled sockets F and pulleys G G, substantially as herein described.

3. The combination of the hollow socket $e$, tubular spindle $h$, with feed-holes $h'$, and pulley G, with spindle-hole and hub $g'$, substantially as herein described.

4. In combination with the hollow socket having tubular spindle $h$, with feed-holes $h'$, the cup-shaped pulley with dished head and hub $g'$, substantially as herein described.

JOHN E. LAYNG. [L. S.]

Witnesses:
EDWARD E. OSBORN,
JNO. L. TAGGARD.